United States Patent
Kathman et al.

(10) Patent No.: US 12,253,657 B2
(45) Date of Patent: Mar. 18, 2025

(54) LENS SYSTEMS AND METHODS OF MANUFACTURE

(71) Applicant: TELEDYNE FLIR COMMERCIAL SYSTEMS, INC., Goleta, CA (US)

(72) Inventors: Alan D. Kathman, Charlotte, NC (US); William J. Hall, Concord, NC (US); Erika Goransson, Täby (SE); Todd E. Rixman, Davidson, NC (US); Bengt Jervmo, Täby (SE); Bo Dahllof, Täby (SE); Stefan Gustavsson, Täby (SE); Leif Sommar, Täby (SE); Olof Holmgren, Täby (SE); Hans Ostling, Täby (SE)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 218 days.

(21) Appl. No.: 17/887,367

(22) Filed: Aug. 12, 2022

(65) Prior Publication Data

US 2022/0382017 A1    Dec. 1, 2022

Related U.S. Application Data

(63) Continuation of application No. 16/712,950, filed on Dec. 12, 2019, now Pat. No. 11,415,783, which is a
(Continued)

(51) Int. Cl.
*G02B 13/00* (2006.01)
*B29D 11/00* (2006.01)
(Continued)

(52) U.S. Cl.
CPC ...... *G02B 13/008* (2013.01); *B29D 11/00432* (2013.01); *G02B 7/028* (2013.01);
(Continued)

(58) Field of Classification Search
None
See application file for complete search history.

(56) References Cited

U.S. PATENT DOCUMENTS

| | | | | |
|---|---|---|---|---|
| 3,709,813 A | * | 1/1973 | Johnson | G01N 27/36 65/30.13 |
| 3,761,572 A | * | 9/1973 | Bither, Jr. | H01L 29/24 257/E29.1 |

(Continued)

FOREIGN PATENT DOCUMENTS

| | | |
|---|---|---|
| CN | 101266409 A | 9/2008 |
| CN | 103256985 A | 8/2013 |

(Continued)

OTHER PUBLICATIONS

Cha et al., "Effect of temperature on the molding of chalcogenide glass lenses for infrared imaging applications", Mar. 20, 2010, vol. 49, No. 9, Applied Optics, 7 pages.
(Continued)

*Primary Examiner* — Mohammad J Rahman
(74) *Attorney, Agent, or Firm* — Haynes and Boone, LLP

(57) ABSTRACT

Systems and methods according to one or more embodiments are provided for annealing a chalcogenide lens at an elevated temperature to accelerate release of internal stress within the chalcogenide lens caused during a molding process that formed the chalcogenide lens. In particular, the annealing process includes gradually heating the chalcogenide lens to a dwell temperature, maintaining the chalcogenide lens at the dwell temperature for a predetermined period of time, and gradually cooling the chalcogenide lens from the dwell temperature. The annealing process stabilizes the shape, the effective focal length, and/or the modulation transfer function of the chalcogenide lens. Associated optical assemblies and infrared imaging devices are also described.

20 Claims, 6 Drawing Sheets

Related U.S. Application Data continuation of application No. PCT/US2018/037642, filed on Jun. 14, 2018.

(60) Provisional application No. 62/519,758, filed on Jun. 14, 2017.

(51) Int. Cl.
*G02B 7/02* (2021.01)
*H04N 5/33* (2023.01)
*H04N 23/11* (2023.01)
*C03C 3/32* (2006.01)

(52) U.S. Cl.
CPC .......... *H04N 23/11* (2023.01); *C03B 2215/46* (2013.01); *C03C 3/321* (2013.01)

(56) References Cited

U.S. PATENT DOCUMENTS

| | | | |
|---|---|---|---|
| 3,770,422 A | 11/1973 | Darnell | |
| 4,552,782 A * | 11/1985 | Cattell | H05B 33/22 204/192.15 |
| 5,146,082 A | 9/1992 | Abe | |
| 5,160,521 A | 11/1992 | Tran | |
| 5,346,523 A | 9/1994 | Sugai et al. | |
| 5,567,401 A * | 10/1996 | Doddapaneni | C01G 51/54 423/608 |
| 5,735,927 A * | 4/1998 | Sanghera | C03B 37/01248 65/412 |
| 6,504,645 B1 * | 1/2003 | Lenz | H01S 3/094003 359/334 |
| 7,492,806 B2 * | 2/2009 | Day | G02B 7/023 372/4 |
| 9,946,053 B1 | 4/2018 | Fry et al. | |
| 2004/0036982 A1 | 2/2004 | Chipper | |
| 2004/0079114 A1 | 4/2004 | Aitken et al. | |
| 2004/0132171 A1 | 7/2004 | Rule et al. | |
| 2004/0206121 A1 | 10/2004 | Autery et al. | |
| 2011/0038587 A1 * | 2/2011 | Shaw | C03B 37/0122 385/127 |
| 2012/0019905 A1 | 1/2012 | Teraoka et al. | |
| 2012/0113504 A1 | 5/2012 | Tanami et al. | |
| 2013/0073785 A1 * | 3/2013 | Emma | G06F 12/0223 711/E12.008 |
| 2013/0228751 A1 * | 9/2013 | Gotsmann | H01L 21/0262 257/14 |
| 2013/0278999 A1 * | 10/2013 | Carlie | C03C 3/32 359/356 |
| 2014/0013554 A1 | 1/2014 | Hojaji | |
| 2015/0079723 A1 * | 3/2015 | Ahmed | H01L 21/02568 438/95 |
| 2015/0196898 A1 * | 7/2015 | Zhang | C03C 15/00 204/157.52 |

FOREIGN PATENT DOCUMENTS

| | | |
|---|---|---|
| CN | 106673414 A | 5/2017 |
| CN | 106830631 | 6/2017 |
| JP | 2001088237 A | 4/2001 |

OTHER PUBLICATIONS

Gabriel Cogburn, "Chalcogenide and Germanium Hybrid Optics", Society of Photo-Optical Instrumentation Engineers, vol. 8189, Oct. 19, 2011, 8 pages.

George Curatu, "Design and fabrication of low-cost thermal imaging optics using precision chalcogenide glass molding", Society of Photo-Optical Instrumentation Engineers, vol. 7060, Aug. 29, 2008, 7 pages.

Novak, Jacklyn, et al. "Investigation of index of refraction changes in chalcogenide glasses during molding processes." Electro-Optical and Infrared Systems: Technology and Applications X. vol. 8896. International Society for Optics and Photonics, 2013.

* cited by examiner

LENS SYSTEMS AND METHODS OF MANUFACTURE

CROSS-REFERENCE TO RELATED APPLICATIONS

This application is a continuation of U.S. patent application Ser. No. 16/712,950 filed Dec. 12, 2019 and entitled "LENS SYSTEMS AND METHODS OF MANUFACTURE", which is hereby incorporated by reference in its entirety.

U.S. patent application Ser. No. 16/712,950 is a continuation of International Patent Application No. PCT/US2018/037642 filed Jun. 14, 2018 and entitled "LENS SYSTEMS AND METHODS OF MANUFACTURE", which in turn claims priority to and the benefit of U.S. Provisional Patent Application No. 62/519,758 filed Jun. 14, 2017 and entitled "LENS SYSTEMS AND METHODS OF MANUFACTURE," which are all hereby incorporated by reference in their entirety.

TECHNICAL FIELD

The present invention relates generally to optical components for thermal imaging and, more particularly, to lenses with enhanced long-term stability and methods of manufacturing such lenses.

BACKGROUND

In the field of thermal imaging, lenses containing chalcogenide glass are used to allow for imaging in a wide infrared spectrum. In compact infrared imaging devices, optical components are required to have high optical precision. Unstable optical characteristics in a lens may negatively affect the image quality of imaging devices.

SUMMARY

Systems and methods are disclosed herein in accordance with one or more embodiments that provide improved lenses for infrared imaging. In particular, the improved lenses may have enhanced stability in their optical characteristics, such as stabilized Effective Focal Length (EFL) and/or Modulation Transfer Function (MTF).

Chalcogenide lenses, such as lenses containing $As_{40}Se_{60}$, are used for infrared imaging, because they allow for transmission of a wide spectrum of infrared light. Chalcogenide lenses may be formed either by a molding process, such as by compression molding, or by a machining process, such as by diamond turning. In general, chalcogenide lenses formed by molding are less costly and less time consuming to manufacture, as compared to chalcogenide lenses formed by machining. However, it was discovered that molded chalcogenide lenses tend to change shape gradually at elevated temperatures. For example, a chalcogenide lens may gradually change shape at temperatures as low as 75° C., which is about 100° C. below the glass transition temperature. The gradual shape change is caused by internal stresses created within the chalcogenide lens during the molding process, in which the chalcogenide lens is quickly cooled and removed from the mold to increase production through-put. The gradual shape change of the chalcogenide lens may cause the Effective Focal Lengths and/or the Modulation Transfer Function (MTF) of the chalcogenide lens to change. Such changes in lens shape will usually degrade the imaging performance and quality of infrared imaging devices installed with the chalcogenide lenses. For example, in a compact infrared imaging device, changes to the focal length as small as 0.01 mm can negatively impact imaging performance. It is noted that $As_{40}Se_{60}$ material is provided as an example. Other chalcogenides or generally any type of glass materials may be utilized with systems and methods described herein.

An annealing process is proposed to stabilize molded chalcogenide lenses, either before or after the chalcogenide lenses are assembled into an optical component assembly. In one embodiment, a method includes annealing a chalcogenide lens at an elevated temperature to accelerate release of internal stress within the chalcogenide lens caused during a molding process that formed the chalcogenide lens. In particular, the annealing process may include gradually heating the chalcogenide lens to a dwell temperature, maintaining the chalcogenide lens at the dwell temperature for a predetermined period of time, and gradually cooling the chalcogenide lens from the dwell temperature.

In one or more embodiments, an optical assembly includes a housing and one or more chalcogenide lenses within the housing. At least one lens of the chalcogenide lenses has a modulation transfer function that remains substantially constant if subjected to an elevated temperature for a period of time. In some embodiments, an infrared imaging device may include the optical assembly. The infrared imaging device may include an image capture component and an image capture interface component.

In one or more embodiments, a method for stabilizing a chalcogenide lens is provided. The method includes heating the chalcogenide lens to an elevated temperature to accelerate release of internal stress within the chalcogenide lens caused by a molding process that formed the chalcogenide lens. The method further includes cooling the chalcogenide lens from the elevated temperature. In some embodiments, an optical assembly and/or an infrared imaging device including one or more chalcogenide lenses stabilized by the method is provided.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
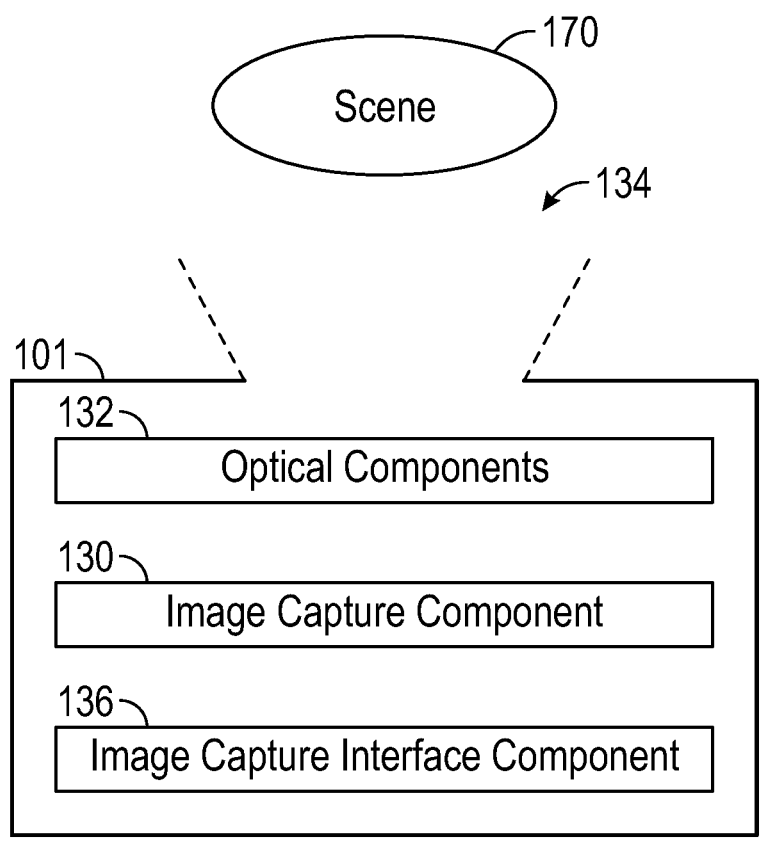
FIG. 1 illustrates a block diagram of an infrared imaging device in accordance with an embodiment of the disclosure.

Techniques are provided to stabilize optical components by an annealing process. In particular, a chalcogenide lens that was formed by molding may subsequently undergo an annealing process to stabilize the lens' optical characteristics, such as the lens' EFL and/or MTF. In particular, the annealing process may heat the chalcogenide lens to an elevated temperature to accelerate the release of internal stress within the chalcogenide lens. The shape and resulting EFL and MTF of the chalcogenide lens may be stabilized after the internal stress in the chalcogenide lens is released.

In various embodiments, the annealing process may include gradually heating the chalcogenide lens to a dwell temperature, maintaining the lens at the dwell temperature for a predetermined period of time, and gradually cooling the chalcogenide lens from the dwell temperature. Heating the chalcogenide lens to the dwell temperature may accelerate the release of internal stress that was exerted in the chalcogenide lens during the molding process. Further, during the annealing process, the chalcogenide lens is gradually heated and gradually cooled to prevent undesired distortion in the chalcogenide lens.

In some embodiments, the annealing process may be performed after the chalcogenide lens is molded and before the chalcogenide lens is assembled with other optical components. In other embodiments, the annealing process may be performed after the chalcogenide lens is molded and assembled into an optical assembly. In this case, the entire optical assembly may undergo the annealing process.

In some embodiments, the chalcogenide lens may be molded to have a pre-anneal shape and EFL. After the annealing process, the chalcogenide lens can change shape and the pre-anneal EFL may stabilize to a post-anneal shape and EFL, which is the desired (target) shape and EFL for the chalcogenide lens. The pre-anneal EFL for each type of chalcogenide lens may be determined by approximation, empirically based upon prior annealing trials, and/or predicted using finite element method (FEM) calculation. For example, based on prior annealing trials, it may be determined that a particular type of chalcogenide lens with an 8.700 mm pre-anneal EFL changes to a stabilized post-anneal EFL of 8.646 mm. Thus, to have a target EFL of 8.646 mm, the chalcogenide lens may first be molded to have an 8.700 mm of pre-anneal EFL. The chalcogenide lens may then undergo the annealing process to stabilize to the target post-anneal EFL of 8.646.

It is noted that $As_{40}Se_{60}$ material is provided as an example. Other chalcogenides or generally any type of glass materials may be utilized with systems and methods described herein. In some cases, systems and methods described herein may be utilized with $As_{40}Se_{60}$ material to mitigate a low glass transition temperature ($T_g$) point relative to the ambient temperature range of a finished lens. For chalcogenides with higher glass transition temperature, an internal stress and shift of refractive shape may be left untreated. When an ambient temperature is distant from the $T_g$ point, distortion of the lens during use may be minimal or nonexistent. However, should such a lens be exposed to higher temperature, e.g. 80° below the $T_g$, the lens shape can change, even after long periods of stable storage.

FIG. 1 illustrates a block diagram of an infrared imaging device 101 in accordance with an embodiment of the disclosure. Infrared imaging device 101 may be used to capture and process image frames in accordance with various techniques described herein. In one embodiment, infrared imaging device 101 may include optical components 132, image capture component 130, and image capture interface component 136. Optical components may include one or more chalcogenide lenses, such as lenses made of $As_{40}Se_{60}$, that allow for imaging in a wide infrared spectrum.

Optical components 132 may receive electromagnetic radiation through an aperture 134 and pass the electromagnetic radiation to image capture component 130. In particular, optical components 132 may direct and focus electromagnetic radiation on image capture component 130.

Image capture component 130 includes, in one embodiment, one or more sensors (e.g., any type visible light, infrared, or other type of detector) for capturing image signals representative of an image of scene 170. In one embodiment, the sensors of image capture component 130 provide for representing (e.g., converting) a captured thermal image signal of scene 170 as digital data (e.g., via an analog-to-digital converter).

Image capture interface component 136 may receive image data captured at the image capture component 130 and may communicate the captured image data to other components or devices, such as via wired or wireless communication. In various embodiments, infrared imaging device 101 may capture image frames, for example, of scene 170 (e.g., a field of view).

In some embodiments, image capture component 130, optical components 132, and image capture interface component 136 may be housed in a protective enclosure. Infrared imaging device 101 may represent any type of camera system which, for example, detects electromagnetic radiation (e.g., thermal radiation) and provides representative data (e.g., one or more still image frames or video image frames). For example, infrared imaging device 101 may be configured to detect visible light and/or infrared radiation and provide associated image data.

Figure 2A:
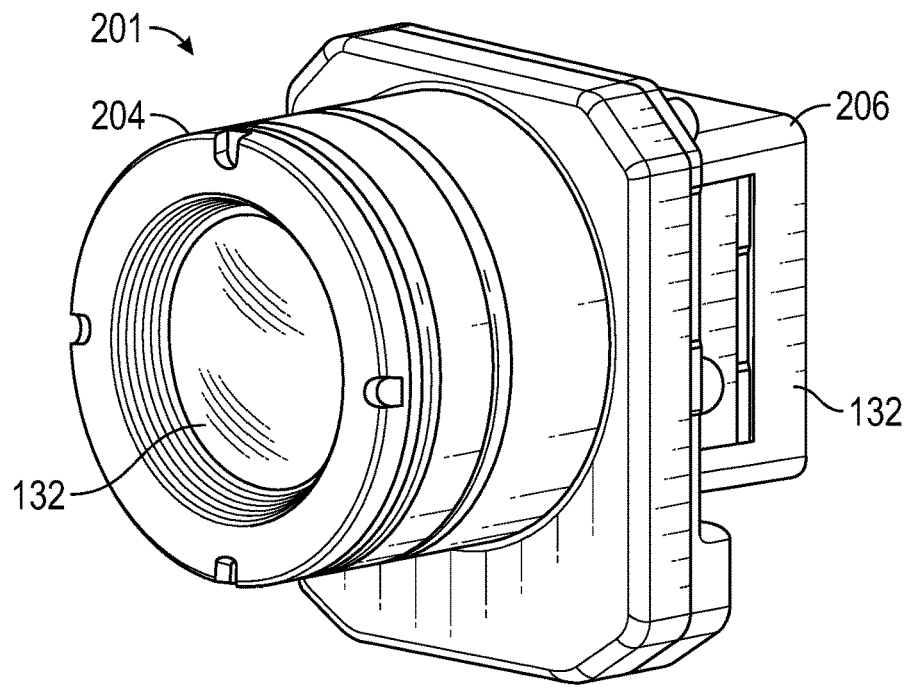
FIG. 2A illustrates a perspective view of an infrared imaging device in accordance with an embodiment of the disclosure.

FIG. 2A illustrates a perspective view of an infrared imaging device 201 in accordance with an embodiment of the disclosure. Infrared imaging device 201 may be an example of the infrared imaging device 101 of FIG. 1. In particular, infrared imaging device 201 may be a Long-Wave Infrared (LWIR) thermal camera, such as a BOSON LWIR Thermal Camera manufactured by FLIR INC. The infrared imaging device 201 may have a compact size of approximately 21 mm×21 mm×11 mm and may weigh approximately 7.5 grams. The infrared imaging device 201 may have operating temperature range of −40° C. to 85° C.

The infrared imaging device 201 may include a lens barrel 204 configured to accommodate optical components, such as optical components 132 in FIG. 1. The infrared imaging device 201 also may include an image capture portion 206 including an image capture component, such as image capture component 130, configured to capture images viewed through the lens barrel 204. The image capture portion 206 may include arrays of microbolometer configured to detect longwave infrared light of wavelengths between 7.5 μm and 13.5 μm.

Figure 2B:
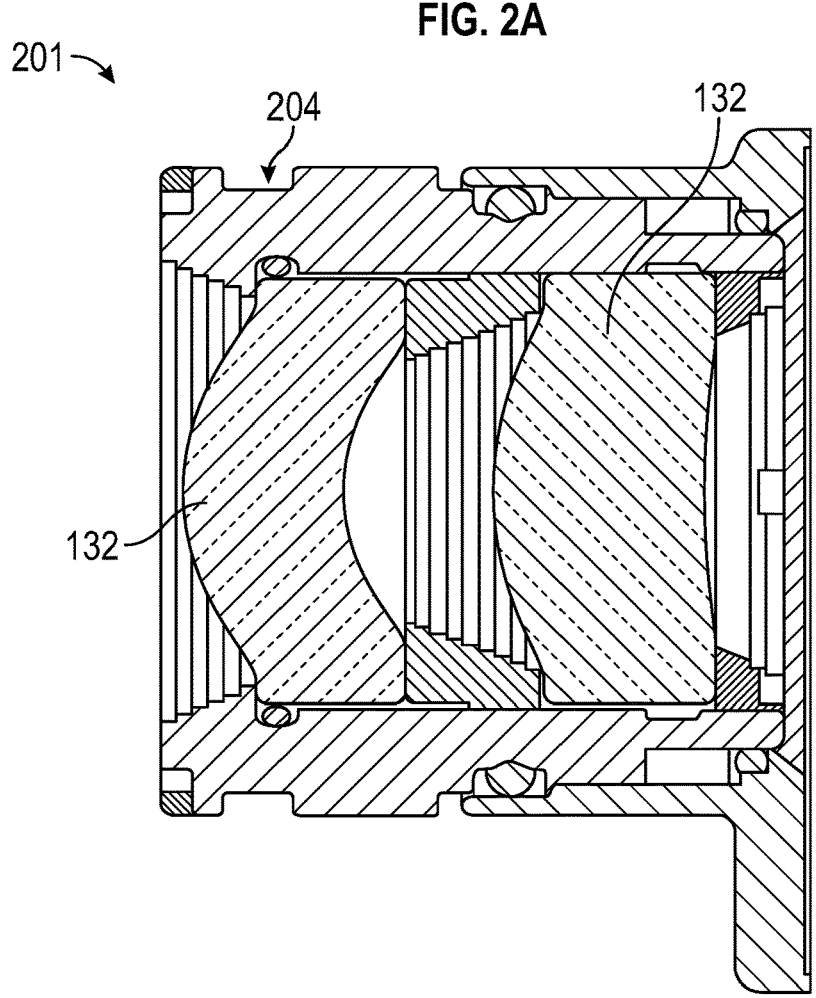
FIG. 2B illustrates a cross-sectional view of the infrared imaging device of FIG. 2A in accordance with embodiments of the disclosure.

FIG. 2B illustrates a cross-sectional view of the infrared imaging device 201 of FIG. 2A in accordance with embodiments of the disclosure. As shown in FIG. 2B, optical components 132 may include two lenses accommodated in lens barrel 204. One or both of the lenses may be chalcogenide lenses configured to transmit a wide spectrum of infrared light. Each of the optical components 132 may have specific optical characteristics, such as a specific EFL and MTF. The optical components may coordinate to direct and focus infrared light onto the image capture component 130.

Figure 3:
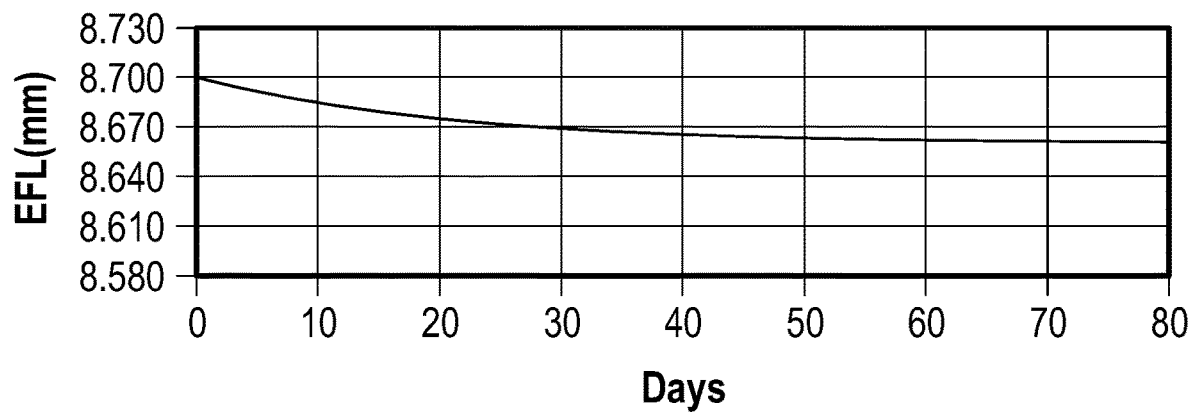
FIG. 3 is a graph illustrating changes in effective focal length of a chalcogenide lens over time in accordance with embodiments of the disclosure.

One or more molded, chalcogenide lenses may be used as the optical components 132. Molded, chalcogenide lenses may gradually change shape, especially in elevated temperatures. This may cause the EFL of the chalcogenide lenses to change and the optical components 132 to lose focus. For example, as shown in FIG. 3, a chalcogenide lens with an EFL of 8.700 mm may gradually change shape at an elevated temperature of 85° C. over an 80-day period. As shown in FIG. 3, the EFL of the chalcogenide lens may slowly stabilize at 8.660 mm.

As the focus of the chalcogenide lens shifts away from the image capture component 130, the image formed on the image capture component 130 will probably become discernibly blurry and the imaging performance of the infrared imaging device 101 thus deteriorate. Accordingly, an annealing process is proposed to stabilize molded, chalcogenide lenses used in the infrared imaging device 101 or 201.

Although the above description uses a longwave infrared imaging device as an example, other types of infrared imaging devices may also have similar challenges and the proposed annealing process may also be implemented to stabilize various optical components used in other imaging devices.

Figure 4:
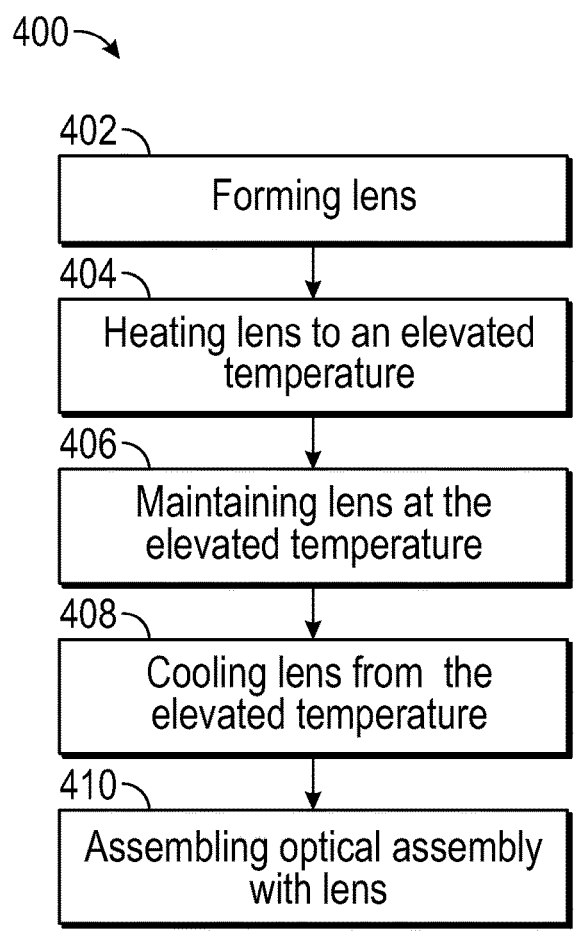
FIG. 4 illustrates a process of manufacturing an imaging capture component in accordance with an embodiment of the disclosure.

FIG. 4 illustrates a process 400 for manufacturing an imaging capture component in accordance with an embodiment of the disclosure. In particular, process 400 may produce a molded, chalcogenide lens with stabilized shape. At block 402, a chalcogenide lens may be formed by a molding process. For example, the chalcogenide lens may be formed in a compression molding process in which glass raw materials including chalcogenide formula may be placed into a rigid mold, heated to a temperature where it can be mechanically deformed (e.g., the glass-transition temperature), and pressed in the mold to form a lens shape. In general, the molded chalcogenide lens is quickly cooled down and removed from the rigid mold to allow for next batch of glass molding. This short process cycle time may increase production throughput and lower production cost. However, the molding and fast cooling of chalcogenide lens will normally create internal stress within the chalcogenide lens. The internal stress may cause the chalcogenide lens to gradually change shape, even at temperatures below its glass transition point.

An annealing process can be implemented to stabilize the molded, chalcogenide lens. Blocks 404 through 408 may represent the annealing process. The chalcogenide lens may be placed in an oven, such as an oven with controlled temperatures. At block 404, the chalcogenide lens may be heated to an elevated temperature. In particular, as an example, the chalcogenide may be heated gradually at a rate of approximately 2.5° C. an hour or at some other desired rate until the chalcogenide lens reaches a dwell temperature. The heating of the chalcogenide lens may prevent distortion in the chalcogenide lens during the heating process depending on the particular application or process as would be understood by one skilled in the art. The heating rate may be adjusted accordingly based on the specific applications and/or the characteristics and parameters of the chalcogenide lens. For example, the heating rate may be increased to speed up the annealing process, but without causing substantial distortion in the chalcogenide lens.

At block 406, the chalcogenide lens may be maintained at the dwell temperature for a predetermined period of dwell time, such as between 1 to 80 hours. The dwell time at the dwell temperature may be adjusted based on the specific applications and/or the characteristics and parameters of the chalcogenide lens. For example, the predetermine period of dwell time may be shortened to speed up the annealing process while still ensuring adequate dwell time to substantially release the internal stress of the chalcogenide lens. In general, a longer dwell time may correspond to a lower dwell temperature while a shorter dwell time may correspond to a higher dwell temperature. This is because the chalcogenide lens may need longer time to release the internal stress when the dwell temperature is lower. Further, larger chalcogenide elements may need longer periods at the dwell temperature to substantially release the internal stress.

At block 408, the chalcogenide lens may be cooled from the dwell temperature. In particular, in some examples, the chalcogenide lens may be cooled gradually at a rate of approximately 2.5° C. an hour. The gradual cooling of the chalcogenide lens may prevent distortion in the chalcogenide lens during the cooling process. The cooling rate may be adjusted accordingly based on the specific applications and/or the characteristics and parameters of the chalcogenide lens. For example, the cooling rate may be increased to speed up the annealing process, but without causing substantial distortion in the chalcogenide lens. Indeed, the gradual heating and gradual cooling may allow the peak MTF performance of the chalcogenide lens to remain substantially the same before and after the annealing process.

At block 410, the chalcogenide lens may be assembled with other optical components to form an optical assembly. The optical assembly may be installed in an infrared imaging device. For example, one or more chalcogenide lens may be installed at respective positions within a lens barrel to provide a specific combination of EFL and MTF, despite a change in lens shape.

In some embodiments, the chalcogenide lens may be assembled into the optical assembly before the annealing process. For example, block 410 may be implemented after block 402 and before block 404. In such case, the entire optical assembly may be annealed along with the chalcogenide lens. This may allow multiple chalcogenide lenses within one optical assembly to be annealed together.

In various embodiments, the annealing process may occur at any point during the manufacturing process 400. For example, the annealing process may occur during other processes of the chalcogenide lens, such as an anti-reflective coating process.

The annealing process in blocks 404-408 may accelerate the release of internal stress within the chalcogenide lens, such that the shape, EFL, and/or MTF of the chalcogenide lens are stabilized. The chalcogenide lens may be formed with a pre-anneal EFL and later be annealed to a post-anneal EFL. The post-anneal EFL may be designated as the target EFL.

In some embodiments, at block 402, the chalcogenide lens may be formed to have a pre-anneal EFL, which is different from the desired target EFL. As such, after the annealing process, the chalcogenide lens may be stabilized to a desired, post-anneal EFL. The corresponding pre-anneal and post-anneal EFL's may be determined for each type of chalcogenide lenses by trials, experiments, and/or FEM calculation. For example, annealing data related to pre-anneal and post-anneal EFL's may be collected for different types of chalcogenide lenses. Based on the annealing data, one may select an appropriate pre-anneal EFL for a particular type of chalcogenide lens in order to result in a desired, post-anneal EFL.

In some embodiments, at block 402, the chalcogenide lens may be formed from raw materials that have a near net shape preforms, near ball shape preforms, near oval shape preforms, plano-plano preforms, or generally any other shape based on application. In other embodiments, the glass mold may be designed in view of the annealing process, such that the lens has the target shape and EFL after the annealing process. In some embodiments, the chalcogenide lens may be reworked after the annealing process to achieve the desired shape and/or EFL. In some aspects, the reworking is an optional step that may occur between blocks 408 and 410. The reworking may involve secondary machining and/or re-molding the chalcogenide lens after stresses have been relaxed through the annealing process.

Figure 5:
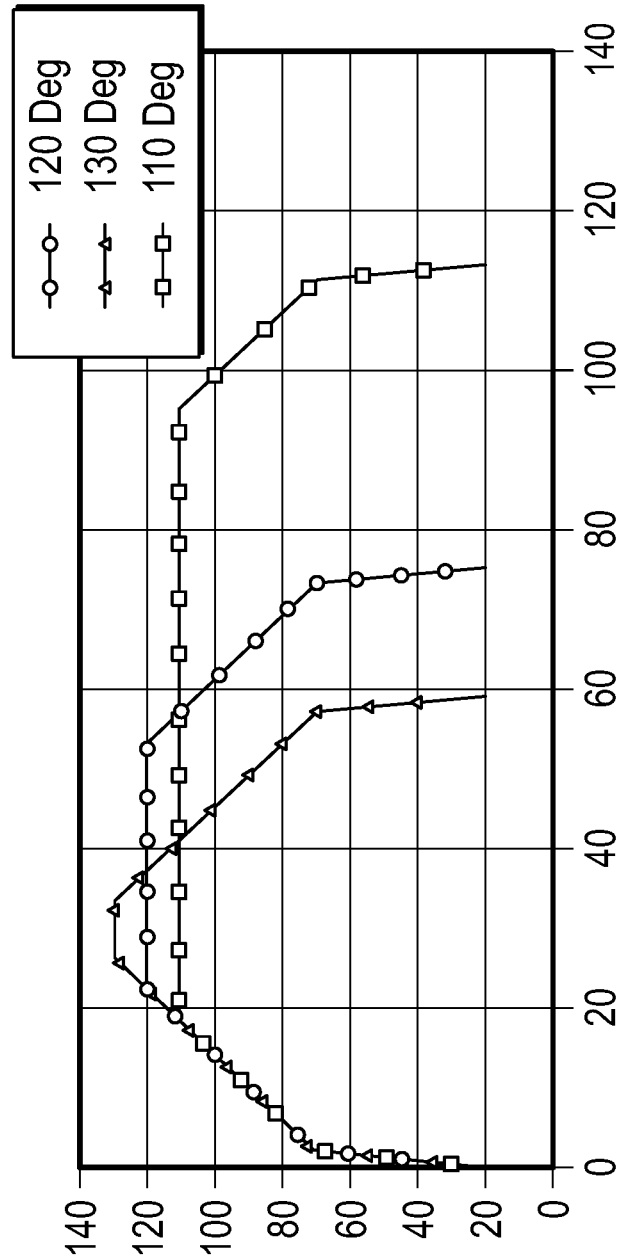
FIG. 5 is a graph that illustrates temperature vs. time of different annealing processes in accordance with embodiments of the disclosure.

FIG. 5 is a graph that illustrates temperature vs. time of different annealing processes in accordance with an embodiment of the disclosure. FIG. 5 illustrates three temperature curves each representing a different annealing process. These curves are provided as non-limiting examples. In some cases, these curves may pertain to stabilizing smaller chalcogenide components. Annealing of longer duration and/or at higher temperatures may be utilized to stabilize larger components.

The first curve with triangles represents an annealing process with a dwell temperature of 130° C. and a dwell time of approximately 5-10 hours. The heating process may include two segments with two different heating rates. The first segment may have a heating rate of approximately 25° C. an hour and the second segment may have a heating rate of approximately 2.5° C. an hour. As shown in FIG. 5, the chalcogenide lens may first be heated at a faster rate of 25° C. from 20° C. (room temperature) to approximately 70° C. The chalcogenide lens may then be heated at a slower rate of 2.5° C. from 70° C. to 130° C. The chalcogenide lens is maintained at the dwell temperature of 130° C. for approximately 5-10 hours.

The cooling process may include two segments with two different cooling rates. The chalcogenide lens may first be cooled at a rate of 2.5° C. from 130° C. to 70° C. and then at a rate of 25° C. from 70° C. to 20° C. (or room temperature). The gradual heating and cooling may prevent distortion in the chalcogenide lens.

The second curve with circles represents an annealing process with a dwell temperature of 120° C. and a dwell time of approximately 30-40 hours. The second curve may have similar heating and cooling rates as the first curve.

The third curve with squares represents an annealing process with a dwell temperature of 110° C. and a dwell time of approximately 80-100 hours. The third curve may have similar heating and cooling rates as the first curve.

As shown in FIG. 5, an annealing process with higher dwell temperature (or dwell temperature) may correspond to a shorter dwell time, because higher temperature may better accelerate the release of internal stress. As such, the dwell time may be reduced. Different annealing processes may be used for annealing different types of optical components. For example, an annealing process with lower dwell temperature may be used to anneal an optical assembly that includes chalcogenide lenses. The lower dwell temperature may prevent heat damage to other optical components in the optical assembly. In another example, an annealing process with higher dwell temperature and shorter dwell time may be used to anneal individual chalcogenide lenses (without other optical components). This may speed up the annealing process. In FIG. 5, the three curves are below the glass transition temperature of the material. The curves allow stresses in the material to relax, changing the shape of the material and therefore the focal length of the lens made from the material.

Figure 6:
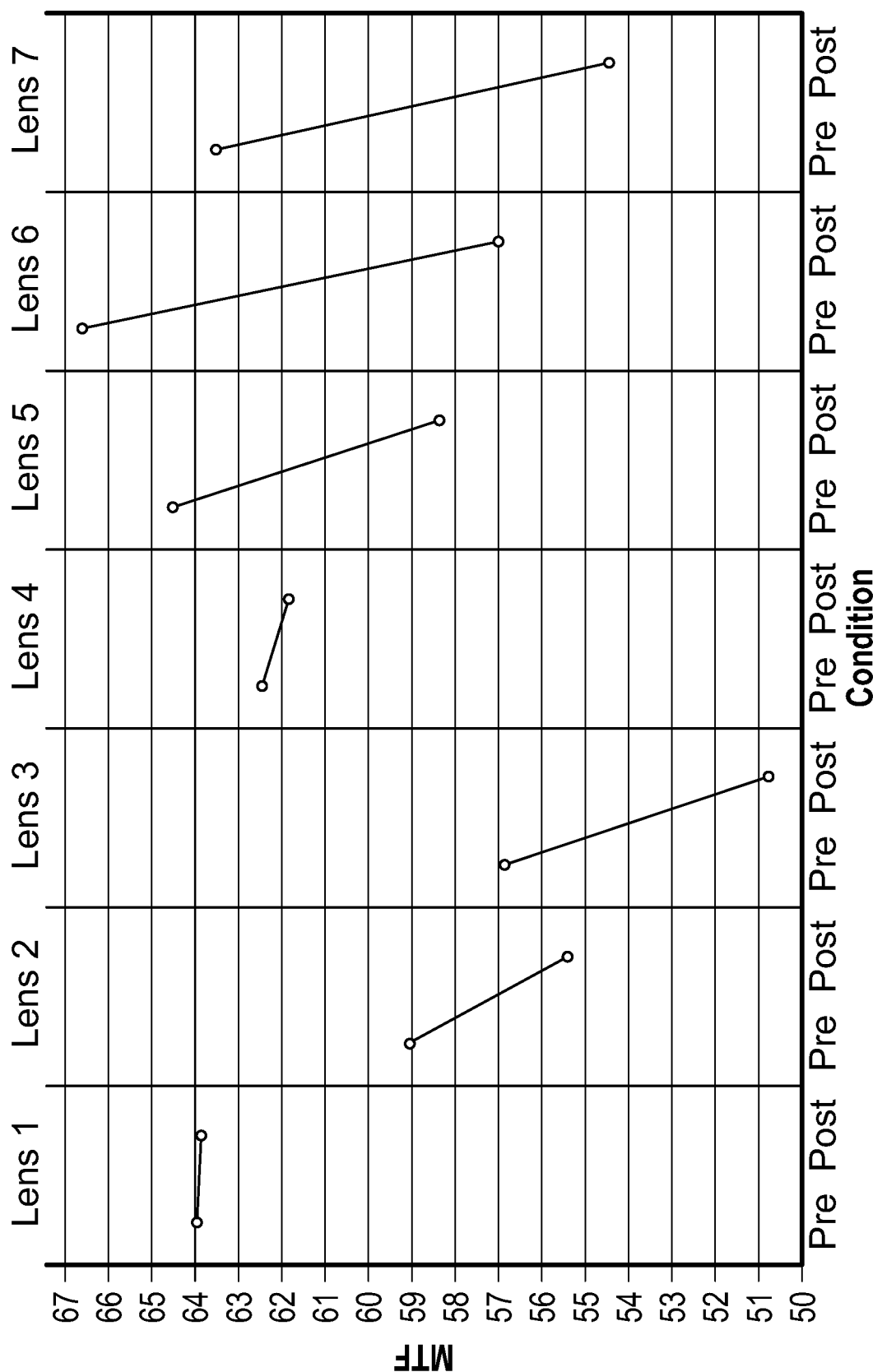
FIG. 6 is a graph that illustrates a modulation transfer function for different lenses before and after subjecting the lenses to an elevated operating temperature for a period of time in accordance with an embodiment of the disclosure.

FIG. 6 is a graph that illustrates an MTF for different lenses (e.g., Lenses 1 through 7) before and after subjecting the lenses to an elevated operating temperature for a period of time in accordance with an embodiment of the disclosure. The lenses may be placed and/or operated at the certain temperature. In some embodiments, the lenses may be placed and/or operated at the certain temperature by exposing the lenses to, maintained the lenses at, and/or holding the lenses at the certain temperature. The MTF may be considered a figure of merit of the lenses and is generally indicative of a focus quality (and an associated image quality) attributable to the lenses. In FIG. 6, the MTF is measured at 21 line-pairs/mm (1p/mm). In an aspect, in some applications, an MTF above 60 is generally associated with acceptable focus.

In some cases, a temperature of 85° C. may be at or close to a top end of a thermal camera's operating temperature range. Likewise, in some cases, it may be a maximum storage temperature for a camera when not in use. In this regard, as a particular example, in FIG. 6, each of Lenses 1-7 is placed at a temperature of 85° C. for 500 hours. For instance, Lenses 1-7 may be placed inside a thermal camera and operated or stored at 85° C. for 500 hours. Lenses 1, 2, and 4-7 were adjusted to best focus on their respective cameras just prior to the "Pre" image evaluation. Lens 3 was set at best focus and then had already undergone being subjected to (e.g., exposed to, maintained at) 85° C. for 500 hours. In this regard, the "Pre" condition of Lens 3 starts when Lens 3 has undergone being subjected to 85° C. for 500 hours, and the "Post" condition of Lens 3 is Lens 3 undergoing another 500 hours at 85° C. For Lenses 1, 2, and 4-7, the "Pre" condition is right before placing Lenses 1, 2, and 4-7 at 85° C. for 500 hours and the "Post" condition is when Lenses 1, 2, and 4-7 have been placed at 85° C. for 500 hours.

Lenses 1-7 may each have one or more chalcogenide elements. For FIG. 6, Lens 1 and Lens 2 are each a narrow field-of-view lens with a single chalcogenide element, and Lenses 3-7 are each a wider field-of-view lens (e.g., relative to Lenses 1 and 2) with two chalcogenide elements. Lenses 1 and 4 were thermally treated using an annealing process in accordance with embodiments of the present disclosure to stabilize the chalcogenide.

For chalcogenide lenses that have not been thermally stabilized through an annealing process (e.g., Lenses 2, 3, and 5-7), their image quality (e.g., as represented by the MTF in FIG. 6) degrades over time more than for chalcogenide lenses that have been thermally stabilized. This reduction in image quality is due to a change in focal length resulting from shape changes in the chalcogenide elements. The change in focal length is generally slow at lower temperatures, but accelerates at elevated temperatures.

In comparing annealed Lenses 1 and 4 and un-annealed Lenses 2, 3, and 4-7, annealed Lenses 1 and 4 maintain a substantially constant MTF (e.g., substantially constant focal length) even after being subjected to an elevated operating temperature (e.g., 85° C.) for an extended period of time (e.g., 500 hours). In FIG. 6, from the beginning of the "Pre" condition to the end of the "Post" condition, Lens 1 has an MTF that changes by around 0.3% and Lens 4 has an MTF that changes by around 1.0%, with the MTF staying at around 64 for Lens 1 and approximately between 62.5 and 61.8 for Lens 4. In contrast, in FIG. 6, Lenses 2, 3, 5, 6, and 7 have an MTF that changes by around 6.1%, 10.7%, 9.6%, 14.4%, and 14.3%, respectively. As such, the change in the MTF over time for the annealed Lenses 1 and 4 is much lower than that for the un-annealed Lenses 2, 3, and 5-7. A corresponding focal length change may be obtained based on a relationship between MTF and focal length as would be known by one skilled in the art.

As shown in FIG. 6, at 85° C., which is at or around the top of a thermal camera's operating temperature range, the thermal camera that utilizes the chalcogenide lenses without annealing treatment (e.g., Lenses 2, 3, and 5-7) may lose focus in as few as 20 days (e.g., around 500 hours). In this regard, for the un-annealed Lenses 2, 3, and 5-7, after being subjected to 85° C. for 500 hours, a focal length change of around 10 micrometers (µm or microns) to around 24 µm (e.g., 0.1% to 0.3%) is detected. The focal length change is determined based on a focal length measurement at the start of the "Pre" condition and at the end of the "Post" condition. After subjecting the lenses to an additional 500 hours at 85° C., an additional 6 µm to 14 µm of focal length change is detected. These focal length changes may be significant in relation to a tolerance associated with a focus range of a thermal camera. In one example, the tolerance may be less than ±10 µm.

In general, since glass is an amorphous solid, glass may flow (e.g., slowly flow) like a liquid. Stresses in the glass, such as those induced during molding chalcogenide materials, may contribute to such a slow flow, and thus the lenses may change shape and therefore change focus. Even though the glass transition temperature of the chalcogenide material may be higher, such as around 160° C., changes in the lens shape that may involve years when at room temperature may occur much more quickly when the lens(es) (e.g., in a camera) is used near a high end of its operating range. As such, shift in focus over time occurs more slowly than that shown in FIG. 6 if the lens(es) is subjected to lower temperatures (e.g., lower than 85° C.). If the lens(es) is subjected to higher temperatures than 85° C., the shift in focus may occur faster than that shown in FIG. 6.

In an embodiment, such as shown for example in FIG. 6, lenses (e.g., chalcogenide lenses) annealed in accordance with embodiments described herein may have an MTF that remains substantially constant over time, even if subjected to a temperature at or around a top of a thermal camera's operating temperature range for an extended period of time. The extended period of time may be 500 hours (e.g., around 20 days), 1000 hours, 2000 hours, half a year, a year, tens of years, or any amount of time in between. The lens may be subjected to (e.g., placed at, operated at) higher temperatures, such as an elevated temperature within a temperature range of around 70° C. to around 120° C. The elevated temperature may be within 80° C. to 90° C., 70° C. to 100° C., and/or other temperature range. The elevated temperature may be around 70° C., 75° C., 80° C., 85° C., 90° C., 95° C., 100° C., 105° C., 110° C., 115° C., 120° C., or any temperature between these provided examples.

The MTF may be measured beginning at the start of the extended period of time and ending (if applicable) at the end of the extended period of time. Changes in MTF over time may be quantified. For example, over the extended period of time at a certain temperature, the MTF of an annealed lens (e.g., lens that has been heat treated using annealing processes described herein) may change by less than 3.0% (e.g., MTF changes between 0% and 3.0%). As other examples, the MTF of an annealed lens may change by less than 2.5%, 2.0%, 1.5%, 1.0%, 0.8%, 0.5%, 0.3%, 0.2%, 0.1%, 0.05%, or any percentage in between these example percentages. In one example, the above-noted examples of the MTF change may occur when the lens is subjected to a temperature of 85° C. for 500 hours or 1000 hours. Lenses that have not been heat treated using annealing processes described herein may exhibit much larger changes in the MTF over the extended period of time, such as a 5% change or higher.

A corresponding focal length change may be obtained based on a relationship between MTF and focal length as would be known by one skilled in the art. For lenses heat treated using annealing processes described herein, the focal length change may be less than the tolerance (e.g., 10 µm or 20 µm) associated with the focus range of a thermal camera. In one embodiment, the focal length change associated with the MTF change provided above may be less than 10 µm, 8 µm, 5 µm, 4 µm, 3 µm, or any focal length change between these example focal length changes. In one embodiment, the focal length change of the lens may be less than 24 µm if the lens is subjected to a temperature of 85° C. for 1000 hours. In other cases, the focal length change of the lens may be less than 20 µm, 18 µm, 15 µm, 12 µm, 10 µm, 10 µm, 8 µm, 5 µm, 4 µm, 3 µm, or any focal length change between these example values if the lens is subjected to a temperature of 85° C. for 1000 hours. Lenses not treated using annealing processes described herein may have focal length changes of 10 µm or higher (e.g., upwards to 24 µm as shown in FIG. 6) if the lens is subjected to a temperature of 85° C. for 500 hours.

In some cases, the MTF over time may be provided as a change in MTF per hour. For example, with reference to FIG. 6, the change in the MTF for Lens 1 and Lens 4 may be around 0.0004 per hour and 0.0012 per hour, respectively. The change in the MTF for Lens 2, 3, 5, 6, and 7 may be around 0.007 per hour, 0.012 per hour, 0.014 per hour, 0.016 per hour, and 0.018 per hour, respectively.

Figure 7:
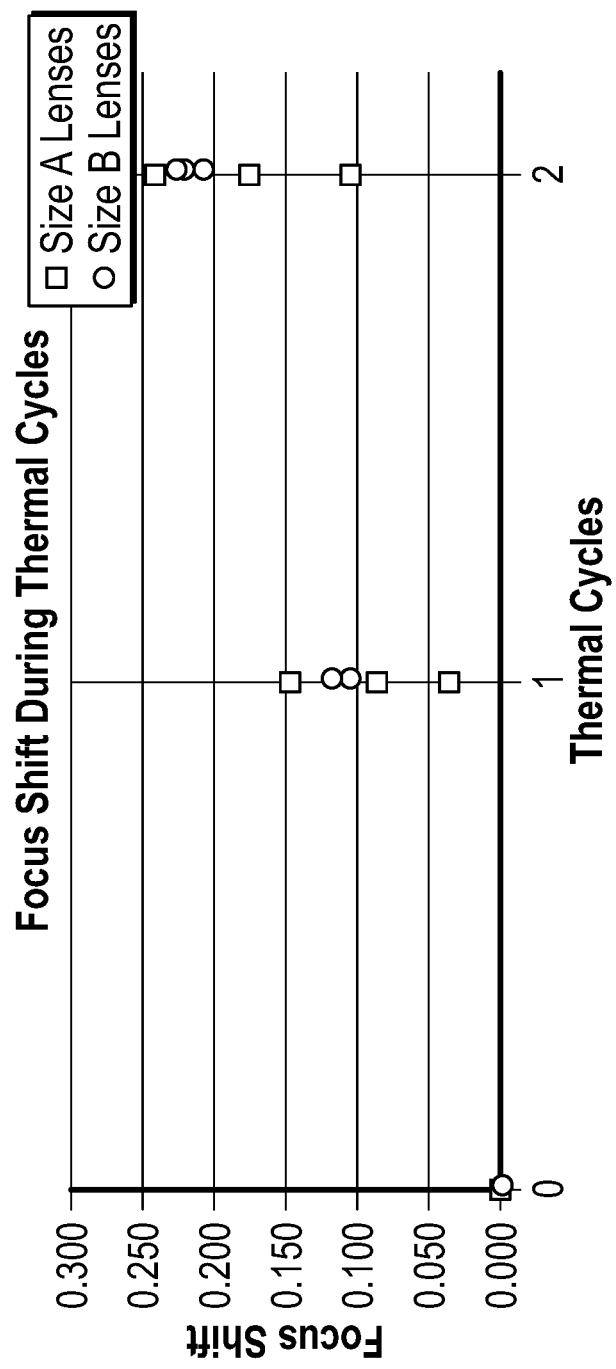
FIG. 7 is a graph showing focal length change of lenses of different sizes in response to thermal cycles in accordance with an embodiment of the disclosure.

FIG. 7 is a graph showing focal length change of lenses of different sizes in response to thermal cycles in accordance with an embodiment of the disclosure. Three Size A lens assemblies and three Size B lens assemblies were tested. As a particular example, in FIG. 7, chalcogenide lens assemblies made from two molded chalcogenide components were subjected to a thermal treatment (e.g., an accelerated thermal treatment) of 110° C. for around 80 hours, per the heat treatment curve shown in FIG. 5. The units for the focal length change are in millimeters. The focal length change may also be referred to as a focus shift. Size A lens assemblies are 13 mm EFL lens assemblies and Size B lens assemblies are three 19 mm lens assemblies. These six lens assemblies were constructed of molded chalcogenide components that have not been thermally treated using the present disclosure's annealing process.

The focal length of each lens is measured and confirmed before the heating tests, with variability in measurement being small. For the heating tests, the focal length of each lens was measured after a single cycle of 110° C. and then after a second cycle of 110° C. Associated focal length change is determined and plotted in FIG. 7, with six focal length changes determined at thermal cycle 0 (e.g., before the heating test), at thermal cycle 1 (e.g., after the first cycle), and at thermal cycle 2 (e.g., after the second cycle).

As shown in FIG. 7, the three 13 mm EFL lenses exhibited a focal length change of around 40 µm to around 150 µm after one cycle and an additional change of around 65 µm to around 95 µm after a second cycle. The three 19 mm EFL lenses exhibited a focal length change of around 100 µm to around 125 µm after one cycle and an additional change of around 90 µm to around 120 µm after a second cycle. The focus shifted for all six lens assemblies, as stresses in the material relaxed at elevated temperatures. In some cases, focus quality may be degraded by changes of less than around 20 µm. In these cases, the focal length changes shown in FIG. 7 are generally associated with unacceptably degraded camera performance.

In an embodiment, for lenses heat treated using annealing processes described herein, the focal length change may be less than 20 µm for 80 hours at 110° C. In some cases, the focal length change may be less than 18 µm, 15 µm, 12 µm, 10 µm, 8 µm, 5 µm, or any focal length change between these values when the lenses are subjected to 110° C. for 80 hours. Lenses not treated using annealing processes described herein may have focal length changes of 40 µm or higher, as shown for example in FIG. 7.

In some embodiments, molded chalcogenide lenses that have been thermally stabilized using the annealing processes described herein may maintain its shape over many years and even for extended periods of time at elevated operating temperatures (e.g., 70° C. to 100° C.). Lenses that have not been thermally stabilized may change shape and shift focus at more elevated temperatures in a few days or tens of days.

Figure 8:
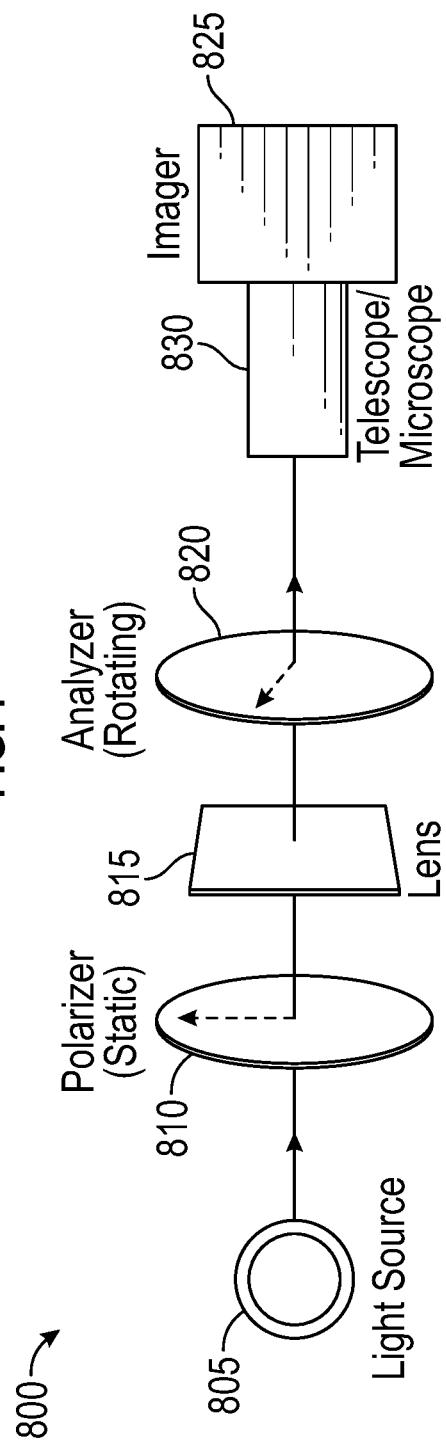
FIG. 8 is a system to facilitate stress analysis of a lens in accordance with an embodiment of the disclosure.

FIG. 8 is a system 800 to facilitate stress analysis of a lens 815 in accordance with an embodiment of the disclosure. The system 800 includes the lens 815, a light source 805, a polarizer 810, an analyzer 820, and an imager 825 and an associated telescope/microscope 830. The polarizer 810 and analyzer 820 may be referred to as a crossed polarizer pair. The imager 825 and telescope/microscope 830 may yield an image(s) of the lens 815 between the crossed polarizer pair. In FIG. 8, the polarizer 810 is a static polarizer and the analyzer 820 is a rotating analyzer.

The polarizer 810 and analyzer 820 may block light from the light source 805 (e.g., a lamp) that is positioned behind the polarizer 810 (e.g., to the left of in polarizer 810 in FIG. 8), except where stress-induced birefringence causes polarization of light from the light source 805 to rotate. As such, detection of the rotated polarization may be used to find residual stress in molded objects, such as the lens 815.

In an aspect, the lens 815 may be a molded chalcogenide component. Appropriate wavelengths (e.g., infrared, ultraviolet, millimeter, or other wavelengths) may be utilized to perform the stress analysis. In some cases, infrared wavelengths may be utilized for chalcogenide components. Polarimetry to analyze stress in a molded chalcogenide component (or other specimen) may reveal whether the molding-included stresses in the chalcogenide component is present and/or significant. In some cases, when the molding-induced stresses are present and significant, the stresses may lead to relaxation of the glass over time. In an aspect, thermal treatment using annealing processes as described herein have been performed, lower stresses are generally observed.

In some embodiments, a measurement of stress distribution in a chalcogenide component (e.g., single chalcogenide component) can be performed using material characterization tools such as polarization-sensitive optical coherence tomography (PSOCT). In some cases, PSOCT systems may create a three-dimensional point could map of local density, refractive index, and stress-induced birefringence for any sample/specimen. In an embodiment, to determine whether a sample has been thermally treated using annealing processes described herein, the sample and a thermally-treated chalcogenide element may be tested using the system 800 of FIG. 8, a PSOCT system, and/or other system such that a relative stress between the two samples can be directly quantified. When the relative stress (e.g., difference in stress in the two samples) is low, the sample may be determined to have been thermally treated. When the relative stress is high, the sample may be determined to not have been thermally treated.

Accordingly, various annealing processes may be used to reduce internal stress within chalcogenide lenses and to stabilize the EFL and MTF of the chalcogenide lenses. Stabilized chalcogenide lenses may provide consistent imaging quality for infrared imaging devices. Although the above description refers to chalcogenide lenses as examples, other types of lenses or optical components may also be treated and stabilized by the annealing process.

It is noted that dimensional aspects (e.g., focal length changes) and processing characteristics (e.g., temperatures, times) provided above are examples and that other values for the dimensions or processing characteristics can be utilized in accordance with one or more embodiments. Furthermore, tolerances may be associated with these dimensional aspects and processing characteristics. For example, subjecting a lens to a temperature of around 85° C. for a period of time may involve subjecting the lens to a temperature between 85° C.±2° C. for the period of time.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for stabilizing a chalcogenide lens, the method comprising:
forming the chalcogenide lens using a molding process;
heating the chalcogenide lens to a dwell temperature; and
cooling the chalcogenide lens from the dwell temperature,
wherein the heating and the cooling form an annealing process to accelerate release of internal stress within the chalcogenide lens caused by the molding process, wherein at least one of the heating or the cooling is performed in a plurality of segments in which each segment of the heating is associated with a respective heating rate or each segment of the cooling is associated with a respective cooling rate.

2. The method of claim 1, further comprising maintaining the chalcogenide lens at the dwell temperature for a predetermined period of time, wherein the predetermined period of time is between about 5 hours and about 100 hours.

3. The method of claim 1, wherein the forming comprises forming the chalcogenide lens to have a pre-anneal shape and a pre-anneal effective focal length (EFL), wherein the heating and/or the cooling stabilizes the chalcogenide lens from the pre-anneal shape and the pre-anneal EFL to a target shape and a target EFL.

4. The method of claim 1, wherein the cooling is performed in two segments such that the cooling comprises cooling the chalcogenide lens at a first rate and then cooling the chalcogenide lens at a second rate different from the first rate.

5. The method of claim 4, wherein;
the first rate is about 2.5° C. an hour and the second rate is about 25° C. an hour; and/or
the cooling the chalcogenide lens at the first rate is for a first time duration and the cooling the chalcogenide lens at the second rate is for a second time duration different from the first time duration.

6. The method of claim 1, wherein the heating is performed in two segments such that the heating comprises heating the chalcogenide lens at a first rate and then heating the chalcogenide lens at a second rate different from the first rate.

7. The method of claim 6, wherein the heating the chalcogenide lens at the first rate is performed for a first time duration and the heating the chalcogenide lens at the second rate is performed for a second time duration different from the first time duration, wherein the first rate is about 25° C. an hour, wherein the second rate is about 2.5° C. an hour, and wherein the cooling comprises cooling the chalcogenide lens at a rate of about 2.5° C. an hour and then at a rate of about 25° C. an hour.

8. The method of claim 6, wherein the heating comprises heating the chalcogenide lens at the first rate to an elevated temperature and then heating the chalcogenide lens at the second rate from the elevated temperature to the dwell temperature, wherein the elevated temperature is below a glass transition temperature of the chalcogenide lens, and wherein the elevated temperature is between about 100° C. and about 140° C.

9. The method of claim 1, further comprising assembling the chalcogenide lens with one or more optical components to form an optical assembly, wherein the heating comprises heating the chalcogenide lens and the one or more optical components, and wherein the cooling comprises cooling the chalcogenide lens and the one or more optical components.

10. The method of claim 1, further comprising assembling the chalcogenide lens with one or more optical components to form an optical assembly, wherein a first temperature is selected for the dwell temperature if the chalcogenide lens is heated with the one or more optical components during the heating, and wherein a second temperature higher than the first temperature is selected for the dwell temperature if the chalcogenide lens is heated without the one or more optical components during the heating.

11. An optical assembly comprising the chalcogenide lens stabilized by the method of claim 1.

12. The optical assembly of claim 11, wherein the chalcogenide lens has a modulation transfer function that remains substantially constant if subjected to an elevated temperature for a period of time.

13. An optical assembly comprising:
a housing; and
a chalcogenide lens, wherein, at a first frequency and a first temperature, the chalcogenide lens has a modulation transfer function with a first value at a start of a period of time and with a second value at an end of the period of time, and wherein a change in the modulation transfer function of the chalcogenide lens from the first value to the second value is associated with a focal length change of less than 20 micrometers.

14. The optical assembly of claim 13, wherein the first temperature is between about 70° C. and about 120° C., and/or wherein the period of time is between about 500 hours and about 1000 hours.

15. The optical assembly of claim 13, wherein the second value has changed by less than 3 percent from the first value if the chalcogenide lens is maintained at the first temperature for the period of time.

16. The optical assembly of claim 13, wherein the chalcogenide lens contains $As_{40}Se_{60}$.

17. An infrared imaging device comprising the optical assembly of claim 13, the infrared imaging device further comprising:
an image capture component configured to receive electromagnetic radiation passed through the optical assembly and generate image data based on the received electromagnetic radiation.

18. The method of claim 1, further comprising removing the chalcogenide lens from a mold after the molding process, wherein the annealing process is performed on the chalcogenide lens after the removing.

19. The method of claim 1, further comprising, after the heating and the cooling, providing an optical assembly comprising the chalcogenide lens.

20. The method of claim 19, wherein, when the chalcogenide lens is within a housing of the optical assembly, the chalcogenide lens has, at a first frequency and a first temperature, a modulation transfer function with a first value at a start of a period of time and with a second value at an end of the period of time, and wherein a change in the modulation transfer function of the chalcogenide lens from the first value to the second value is associated with a focal length change of less than 20 micrometers.

* * * * *

UNITED STATES PATENT AND TRADEMARK OFFICE
CERTIFICATE OF CORRECTION

PATENT NO. : 12,253,657 B2
APPLICATION NO. : 17/887367
DATED : March 18, 2025
INVENTOR(S) : Alan D. Kathman et al.

It is certified that error appears in the above-identified patent and that said Letters Patent is hereby corrected as shown below:

In the Specification

In Cross-Reference to Related Applications:

In Column 1, Line 7-8, change "patent application Ser. No." to --Patent Application No.--.

In Column 1, Line 12, change "patent application Ser. No." to --Patent Application No.--.

Signed and Sealed this
Thirteenth Day of May, 2025

Coke Morgan Stewart
*Acting Director of the United States Patent and Trademark Office*